US012743345B2

(12) United States Patent
Thomsen

(10) Patent No.: US 12,743,345 B2
(45) Date of Patent: Sep. 22, 2026

(54) SYSTEMS AND METHODS FOR DATA RECOVERY

(71) Applicant: SAP SE, Walldorf (DE)

(72) Inventor: Dirk Thomsen, Heidelberg (DE)

(73) Assignee: SAP SE, Walldorf (DE)

( * ) Notice: Subject to any disclaimer, the term of this patent is extended or adjusted under 35 U.S.C. 154(b) by 86 days.

(21) Appl. No.: 18/487,482

(22) Filed: Oct. 16, 2023

(65) Prior Publication Data

US 2025/0123931 A1 Apr. 17, 2025

(51) Int. Cl.
*G06F 11/1446* (2026.01)
*G06F 9/50* (2006.01)
*G06F 11/10* (2006.01)

(52) U.S. Cl.
CPC ........ *G06F 11/1469* (2013.01); *G06F 9/5016* (2013.01); *G06F 9/5038* (2013.01); *G06F 11/1004* (2013.01)

(58) Field of Classification Search
CPC .... G06F 11/1469; G06F 11/14; G06F 3/0619; G06F 9/50
See application file for complete search history.

(56) References Cited

U.S. PATENT DOCUMENTS 5,568,443 A 10/1996 Dixon et al.
6,625,623 B1 * 9/2003 Midgley ............ G06F 11/1451 715/236
10,310,946 B2 6/2019 Thomsen
10,360,111 B2 7/2019 Thomsen
10,922,189 B2 * 2/2021 Swallow ............... G06F 11/302
2002/0154640 A1 10/2002 Wei
2006/0206489 A1 9/2006 Finnie et al.
2012/0136850 A1 * 5/2012 Barsness ........... G06F 16/24547 707/720
2012/0221826 A1 8/2012 Haines et al.
2014/0237197 A1 8/2014 Gray
2015/0052157 A1 2/2015 Thompson
2018/0253467 A1 9/2018 Gurajada et al.
2018/0260425 A1 9/2018 Thomsen et al.
2019/0018740 A1 * 1/2019 Thomsen ............ G06F 11/1474
2019/0340017 A1 11/2019 Scheuer et al.
2021/0157649 A1 * 5/2021 Ibryam ..................... G06F 9/52
2021/0303199 A1 9/2021 Horspool et al.
2022/0092025 A1 3/2022 Vaideeswaran et al.
2022/0382712 A1 12/2022 Thomsen et al.
2023/0305994 A1 * 9/2023 Schay ................... G06F 9/4881
2023/0409535 A1 * 12/2023 Kashi Visvanathan ... H04L 9/14
2024/0028470 A1 1/2024 Gottipati et al.

OTHER PUBLICATIONS

Checksum (Wikipedia), https://web.archive.org/web/20230922175818/https://en.wikipedia.org/wiki/Checksum, Sep. 2023 (Year: 2023).

* cited by examiner

*Primary Examiner* — Philip Guyton
*Assistant Examiner* — Sean Kevin Mcnamara
(74) *Attorney, Agent, or Firm* — Fountainhead Law Group, PC

(57) ABSTRACT

Embodiments of the present disclosure include techniques for recovering data. In one embodiment, data is copied to a buffer. A plurality of processing functions receive the data in the buffer as data pages and perform processing operations. The processed data pages are then stored in persistent memory. The main memory is monitored so that the main memory of the database is maintained in a state such that a consistent flow of data may be written to persistent memory during the recovery process.

20 Claims, 4 Drawing Sheets

SYSTEMS AND METHODS FOR DATA RECOVERY

BACKGROUND

The present disclosure relates generally to software systems, and in particular, to systems and methods for data recovery.

With the explosive growth of electronic data, ensuring data integrity has become an ever-increasing challenge. Data is often stored in one or more databases. When databases fail, it is important to have a backup copy of the database so that the data may be recovered. Database backups typically occur at regular intervals. Accordingly, when a database fails, data from the previous backup may be used to recover the state of the data at the time the last backup was performed.

However, recovering data into a database can be time consuming. Large volumes of data must be moved from the backup system to the database, and often computationally intensive processing may need to occur. Accordingly, recovery systems must be as fast and efficient as possible.

The present disclosure addresses these and other challenges and is directed to techniques for data recovery.

DETAILED DESCRIPTION

Described herein are techniques for data recovery. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

Figure 1:
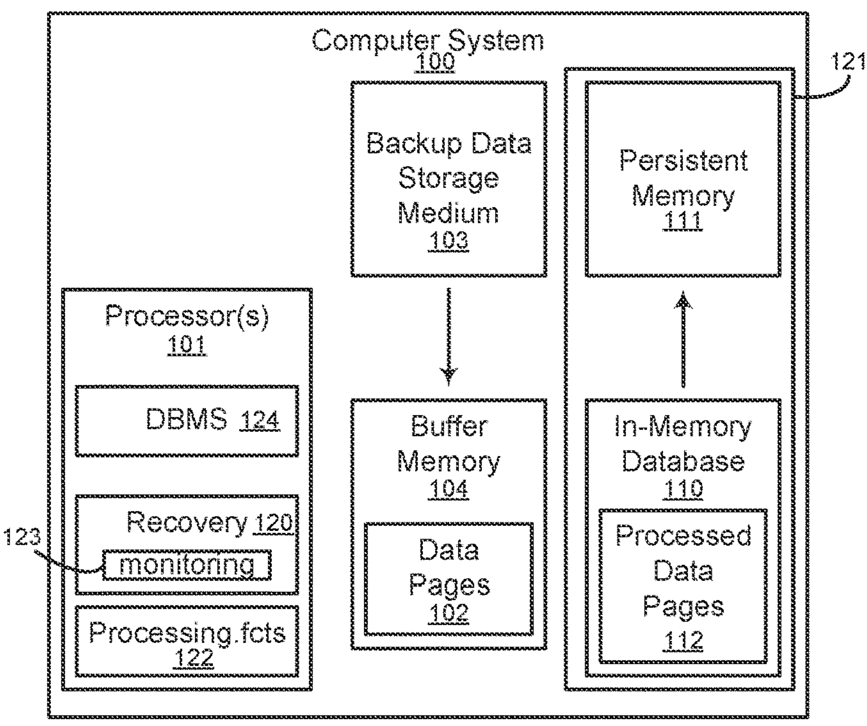
FIG. 1 illustrates a system for data recovery according to an embodiment.

FIG. 1 illustrates a system for data recovery according to an embodiment. Features and advantages of the present disclosure include recovering data such that intermediate memories are optimized to prevent intermediate memories from running empty or overloading, which can cause delays in the recovery process. In this example, a computer system 100 includes one or more processors 101 and one or more non-transitory computer readable data storage medium, such as buffer memory 104 and persistent memory 111 (e.g., solid state hard drives, disks, tapes, or the like). Computer system 100 may comprise multiple computers, for example, coupled together over a computer interconnect mechanism (e.g., wired, such as Ethernet, or wireless, such as WiFi or cellular). Each computer may have one processor or multiple processors, for example. Buffer memory 104 may reside in any of a variety of memories, such as a dynamic random access memory (DRAM), for example. Persistent memory 111 may comprise one or more solid state hard drives, disks, tapes, or the like. Computer system 100 includes a database system 121 comprising in-memory database 110 and persistent memory 111. In-memory database 110 may store data in database tables in DRAM or processor cache, for example. In-memory database 110 of database system 121 is sometimes referred to as the database's "main memory" or just "memory 110" herein. Database 121 may include a database management system (DBMS) 124 for synchronizing or otherwise managing data residing in database main memory 110 and data stored in persistent memory 111, for example.

Recovering data from a backup data storage system may include creating an empty database 121 (e.g., in the case of full data recovery). Recovery software 120 (e.g., a software object) may read data from backup data storage 103. Recovery software 120 may allocate buffer memory 104 in DRAM (sometimes referred to as, "heap memory") for storing the backup data. In some embodiments, recovery software 120 may read data from backup data storage 103 in chucks and generate data pages 102 that are transferred to database main memory 110.

Data in buffer memory 104 are copied to database main memory 110 as data pages. Recovery software 120 may allocate memory in database main memory 110 on a page-by-page basis as data pages are copied over, for example. Recovery software 120 may perform a plurality of processing functions 122 on the data pages 102 to produce processed data pages 112. In some embodiments, processing functions 122 operate in parallel. For example, processing functions 122 may be individual jobs (e.g., software objects that perform some type of data processing job) that operate on a plurality of threads in parallel. Processing functions 122 produce processed data pages 112 in database main memory 110 (e.g., in a queue as described below). Processed data pages 112 may then be written to persistent memory 111 of database system 121. Advantageously, recovery software 120 includes a monitoring software component 123. Monitoring software 123 monitors the available capacity of memory 110. To optimize the flow of data from backup data storage 103 to persistent memory 111 during recovery, recovery software 120 may adjust a throughput of the plurality of processing functions 122 based on the monitored capacity of the database main memory 110 so that the available capacity of the memory is between first and/or second thresholds. For example, when memory 110 becomes too full, the throughput of processing functions 122 may be reduced. However, when memory 110 starts to become empty, the throughput of processing functions 122 may be increased. Accordingly, memory 110 is maintained in a state such that a consistent flow of data may be written to persistent memory during the recovery process, thereby reducing the time required to perform a database recovery procedure.

Figure 2:
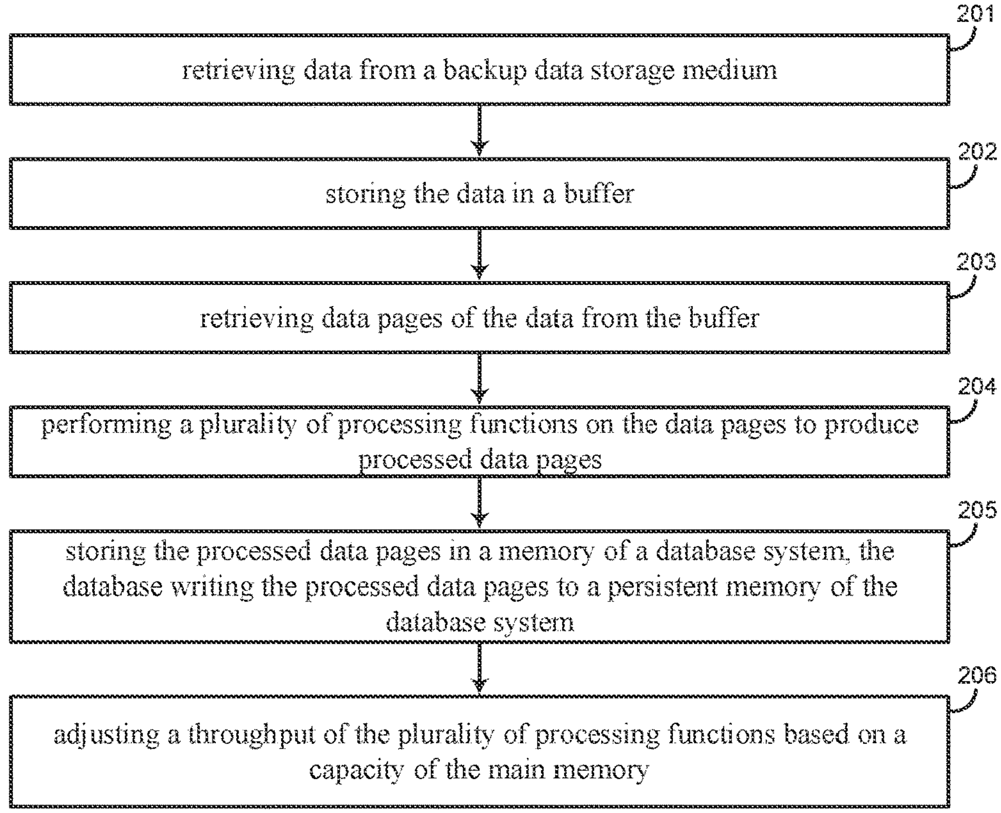
FIG. 2 illustrates a method for data recovery according to an embodiment.

FIG. 2 illustrates a method for data recovery according to an embodiment. At 201, data is retrieved from a backup data storage medium. At 202, the data is stored in a buffer. At 203, data pages of the data are retrieved from the buffer. At 204, a plurality of processing functions are performed on the data pages to produce processed data pages. At 205, the processed data pages are stored in a main memory (e.g., an in-memory portion) of a database system. Thereafter, the database writes the processed data pages to a persistent memory of the database system. At 206, a throughput of the plurality of processing functions is adjusted based on an available capacity of the main memory.

Figure 3:
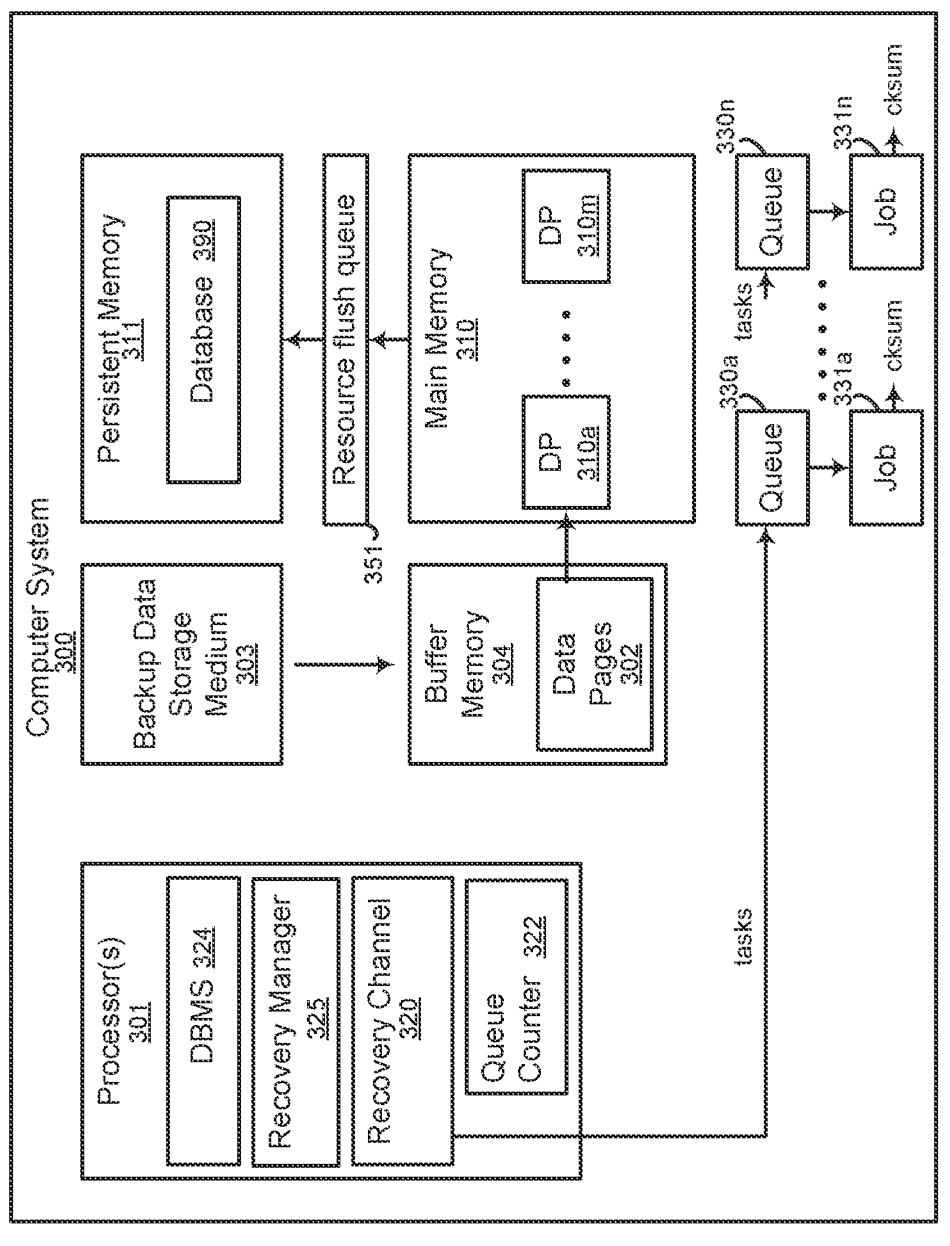
FIG. 3 illustrates an example database and data recovery system according to another embodiment.

FIG. 3 illustrates an example database and data recovery system according to another embodiment. In this example, recovering data from a backup data storage medium 303 includes creating an empty database 390 in persistent memory 311, invoking a recovery manager 325 to read all data from the backup media 303, store the data in buffer memory 304 (e.g., in DRAM), convert the backup data to data pages, and push the data pages to the recovery channel 320, which may be an object for processing the data (e.g., a recovery channel object in an object oriented programming language). Recovery channel 320 allocates data pages 310*a-m* in main memory 310 and stores data pages 302 in main memory 310.

Next, for each data page, recovery channel 320 may create a plurality of jobs 331*a-n* running on a plurality of threads for performing processing functions in parallel. For example, the jobs 331*a-n* may each perform checksum operation. In this example, each job 331*a-n* has a corresponding queue 330*a-n* to receive tasks to process particular data pages 310*a-m*. For instance, recovery channel 320 may allocate a data page to a particular address in main memory 310, and then include the address for (e.g., a pointer to) the data page in a task sent to a job queue, for example. Accordingly, tasks reference particular data pages 310*a-m* to be processed by a particular job, for example. Jobs 331*a-n* then receive one or more tasks from queues 330*a-n*. In one embodiment, queues 330*a-n* are single-in-multiple out queues, and when jobs 331*a-n* retrieve tasks from their queues, the jobs retrieve all the tasks currently in the corresponding queue. Tasks are then executed by jobs one at a time, for example. When a task in a queue 330*a-n* is executed by a job 331*a-n*, the job retrieves a data page, processes the data page, and sends the processed data page to resource flush queue 351. Processed data pages sent to resource flush queue 351 are then saved in persistent memory 311 as described further below. In one embodiment, data pages in main memory are not deallocated until after the page is sent to persistent memory.

Initially, a predetermined number of jobs (and queues) may be created by recovery channel 320. Additionally, recovery channel 320 may have a maximum number of jobs, and the initial number of jobs may be less than the maximum number of jobs, for example. Since jobs 331*a-n* are running in parallel, it is possible that main memory 310 may overflow because a data page in main memory, as mentioned above, may not be deallocated until the page is successfully sent to persistent memory. Additionally, recovery channel 320 may store one block of data after the other in buffer memory 304. For each page within the buffer 304, an in-memory page 310*a-m* in memory 310 may be allocated and then added to one of the queues 330*a-n*. Recovery channel 320 may then wait until all pages are processed by jobs 331*a-n* before loading another page. If the jobs 3312*a-n* are processing data faster than resource flush queue 351 can write them to persistent memory, recovery channel 320 may overflow main memory 310 as the jobs complete their tasks without the data pages being removed from main memory. Accordingly, it may be desirable to reduce the number of jobs running in parallel when the main memory available capacity is too low to keep pace with downstream writing of data pages to persistent memory. In some embodiments, the current available capacity (e.g., amount of unused memory) of the main memory is monitored. When the available capacity of main memory is below a first memory threshold, which may indicate that tasks are backlogging (e.g., writing pages to persistent memory is too slow and main memory pages are not being deallocated), the number of jobs may be reduced to reduce the throughput. Accordingly, main memory is advantageously prevented from overflowing.

In some embodiments, the throughput may be adjusted based on the relative speeds of (i) retrieving backup data to buffer 304 and (ii) the speed of the jobs 331*a-n*. In some embodiments, a block of data may be retrieved from backup storage and stored in buffer memory 304. The data in buffer memory 304 may then be broken up into pages and stored in main memory as mentioned above. As data pages are stored in main memory, tasks for each page are placed in queues of the jobs (e.g., a pointer to the page is placed in a job's queue). One simple example is round robin placement. For instance, a first page may be placed in a first job queue, a second page may be placed in a second job queue, and so on up to the nth job/queue, at which point an (n+1)st page is placed in the first job queue again, an (n+2)nd page is placed in the second job queue, and so on. In one embodiment, the queues are single-in-multiple out, wherein when a job finishes a previous task, the job retrieves all tasks (pages) in the queue and processes each task sequentially. To optimize the flow of data between buffer memory 304 and jobs 331*a-n*, embodiments may include queue counter 322, which monitors queues 330*a-n*. More specifically, queue counter 322 monitors the number of tasks in queues 330*a-n*. The number of tasks in the queues may be compared to thresholds to increase or decrease the number of jobs running in parallel.

For example, in some cases, when a number of tasks in the queues is above a threshold (indicating that the jobs are not keeping up with the retrieval of backup data into the buffer memory), then the number of jobs may be increased. Alternatively, when a number of tasks in the queues is below a threshold, which may indicate the current jobs are faster than the retrieval of backup data into the buffer memory, then the number of jobs may be reduced, for example. In one embodiment, queue counter 332 monitors tasks in queues 330*a-n* to increase or decrease the number of jobs 331*a-n* (and the throughput). For example, in some embodiments, a single queue counter monitors the number of empty queues (e.g., an empty queue counter). In this example, the empty queue counter may inspect the queues and increase the count for each empty queue and decrease the count for any queue that has more than one task in the queue (where one task in each queue at all times is approximately a steady state between retrieving backup data and processing the pages into persistent memory). As the empty queue counter inspects each queue, the count may increase (for empty queues) or decrease (for queues having more than one task in the queue). When the counter increases above a first empty counter threshold (indicating many empty queues), the number of jobs may be reduced. When the empty queue counter decreases below a second empty counter threshold (indicating many queues with more than one pending task), the number of jobs may be increased. In some embodiments, monitoring the job queues may be combined with monitoring main memory described above. In some embodiments, adjusting the throughput of the processing functions based on the available capacity of the main memory may be prioritized over increasing or decreasing the number of processing functions based on the number of tasks in the queues to prevent memory overflow, for example.

As mentioned above, processed data pages 310*a-m* in memory 310 are sent to resource flush queue to be stored in persistent memory 311 of the database system 390, for example. Additionally, resource flush queue 351 may encrypt the data pages 310*a-m* before they are stored in database 390, for example.

Figure 4:
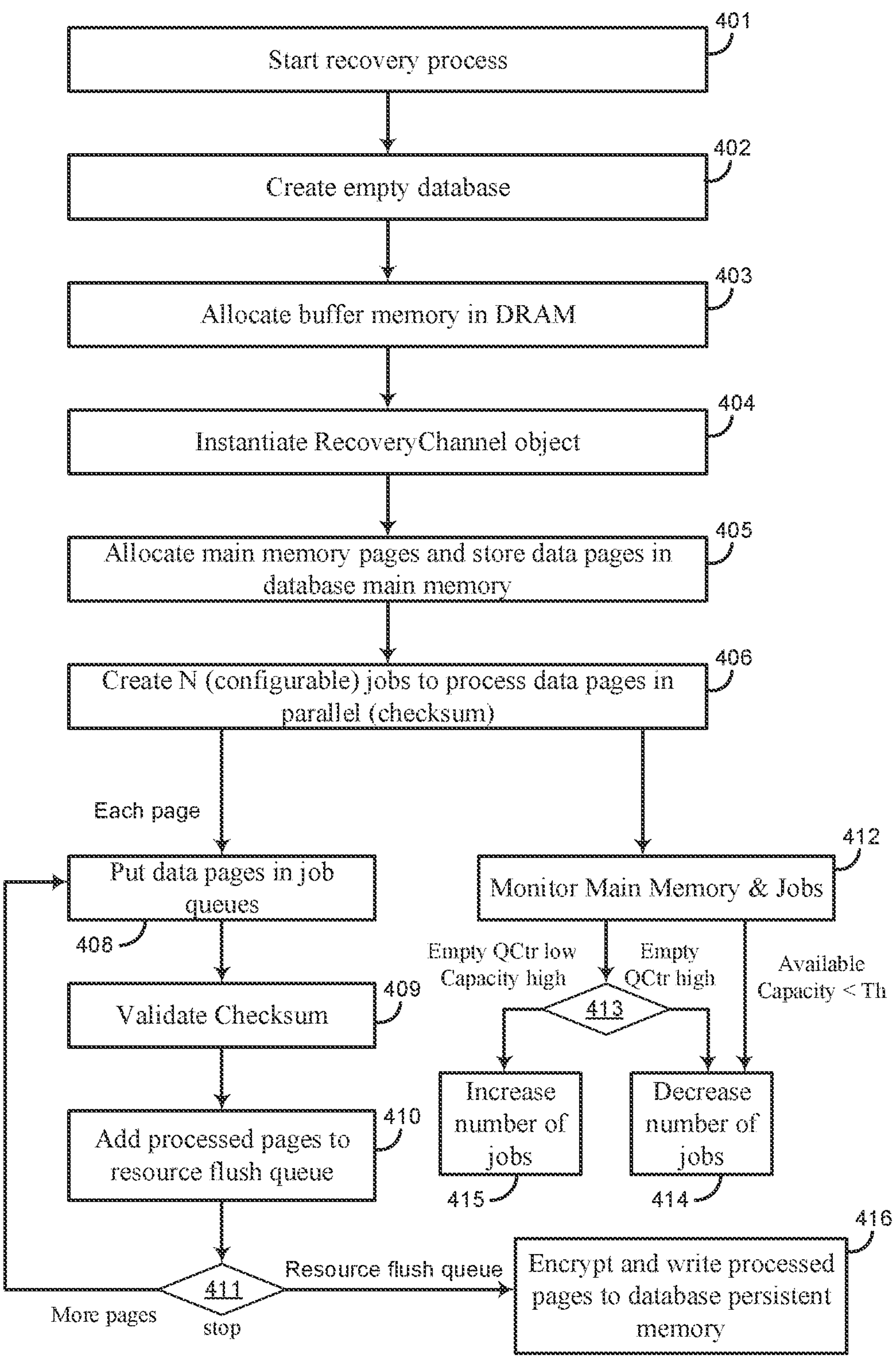
FIG. 4 illustrates an example flow diagram for data recovery in a database according to another embodiment.

FIG. 4 illustrates an example flow diagram for data recovery in a database according to another embodiment. In this example, the recovery process starts at 401. At 402, an empty database is created. At 403, a buffer is allocated in DRAM and a block of backup data is stored in buffer memory. At 404, a RecoveryChannel object is instantiated. RecoveryChannel object may be software code for implementing the techniques described herein and may have a number of subroutines, child objects, methods, or other constructs. While the present example illustrates certain features being implemented as part of a single object, it is to be understood the multiple objects and/or other programming constructs or implementations may be used. At 405, the block of data in the buffer is divided into data pages allocated in database main memory and stored. At 406, N jobs are created (e.g., where N is configurable) to process data pages in parallel. Each data page in main memory is assigned to a job as a task. Each job may include a corresponding queue, for example, where tasks assigned to the job are received and stored. Processing may include performing, by each job, a checksum operation on each data page. At 408, data pages are passed to queues associated with each job. At 409, a checksum is validated for each page by each job. At 410, processed pages are added (e.g., pointers are sent) to the resource flush queue to be written to persistent memory. If there are more pages to be processed, the jobs repeat steps 407-410. While the jobs are processing data pages, the jobs and main memory are monitored at 412. If the available capacity in main memory falls below a threshold, the number of jobs is reduced at 414. Additionally, the queues for each job may be monitored and tasks in each queue are counted. An empty queue counter may count the number of empty queues and a number of queues with more than one task. If the number of empty queues is high at 413 (Empty QCtr greater than a first threshold), the number of jobs may be decreased at 414. However, if the number of empty queues is low at 413 (Empty QCtr lower than a second threshold), the number of jobs may be increased at 415. As jobs complete processing data pages in main memory, the pages are sent to a resource flush queue. Resource flush queue encrypts the pages and writes the pages to the database persistent memory at 416 to fill the empty database.

Figure 5:
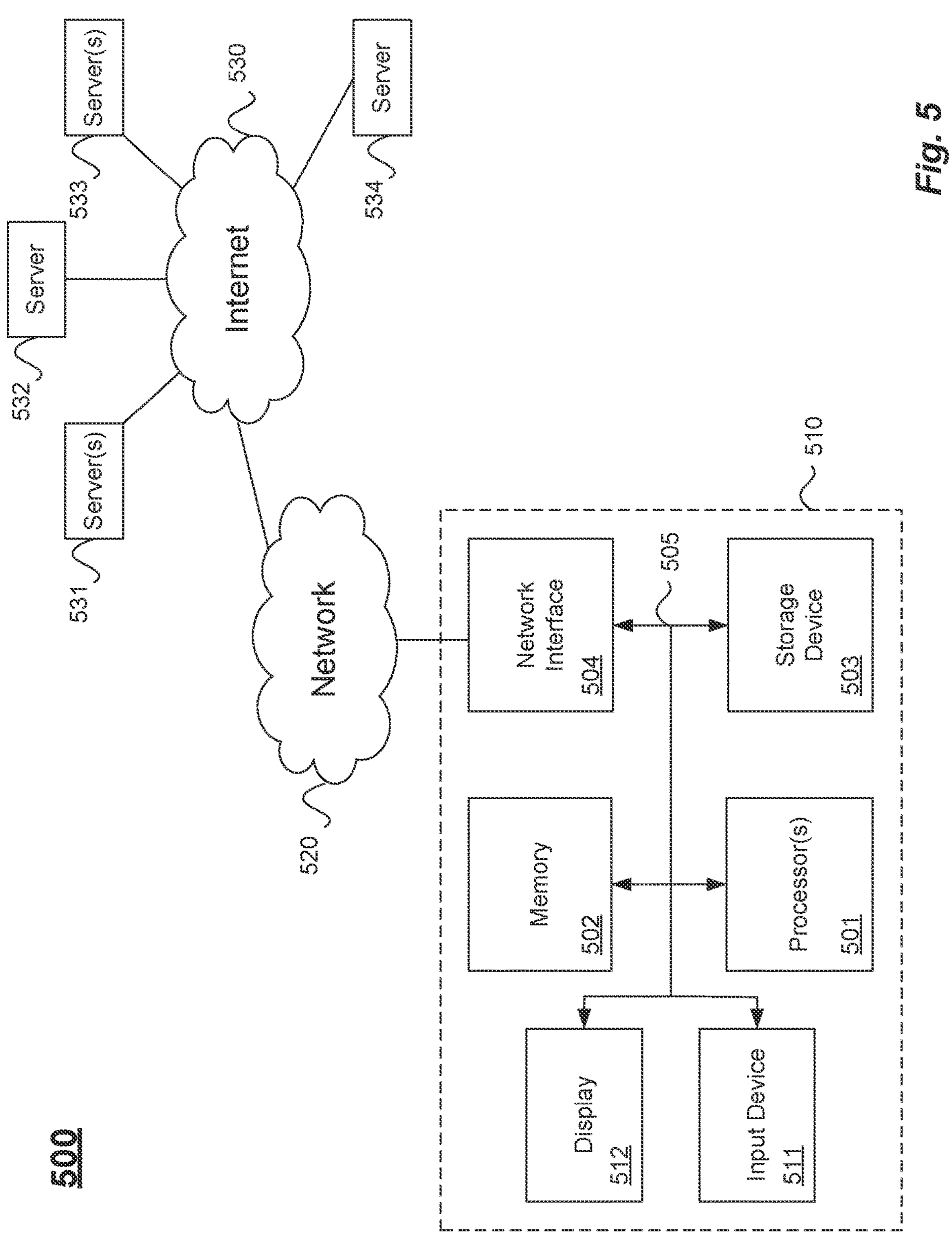
FIG. 5 illustrates hardware of a special purpose computing system configured according to the above disclosure.

FIG. 5 illustrates hardware of a special purpose computing system 500 configured according to the above disclosure. The following hardware description is merely one example. It is to be understood that a variety of computers topologies may be used to implement the above-described techniques. An example computer system 510 is illustrated in FIG. 5. Computer system 510 includes a bus 505 or other communication mechanism for communicating information, and one or more processor(s) 501 coupled with bus 505 for processing information. Computer system 510 also includes memory 502 coupled to bus 505 for storing information and instructions to be executed by processor 501, including information and instructions for performing some of the techniques described above, for example. Memory 502 may also be used for storing programs executed by processor(s) 501. Possible implementations of memory 502 may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, solid state disk, a flash or other non-volatile memory, a USB memory card, or any other electronic storage medium from which a computer can read. Storage device 503 may include source code, binary code, or software files for performing the techniques above, for example. Storage device 503 and memory 502 are both examples of non-transitory computer readable storage mediums (aka, storage media).

In some systems, computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses for coupling various components of the computer together, for example.

Computer system 510 also includes a network interface 504 coupled with bus 505. Network interface 504 may provide two-way data communication between computer system 510 and a local network 520. Network 520 may represent one or multiple networking technologies, such as Ethernet, local wireless networks (e.g., WiFi), or cellular networks, for example. The network interface 504 may be a wireless or wired connection, for example. Computer system 510 can send and receive information through the network interface 504 across a wired or wireless local area network, an Intranet, or a cellular network to the Internet 530, for example. In some embodiments, a frontend (e.g., a browser), for example, may access data and features on backend software systems that may reside on multiple different hardware servers on-prem 531 or across the network 530 (e.g., an Extranet or the Internet) on servers 532-534. One or more of servers 532-534 may also reside in a cloud computing environment, for example.

Further Examples

Each of the following non-limiting features in the following examples may stand on its own or may be combined in various permutations or combinations with one or more of the other features in the examples below. In various embodiments, the present disclosure may be implemented as a system, method, or computer readable medium.

Embodiments of the present disclosure may include systems, methods, or computer readable media. In one embodiment, the present disclosure includes computer system comprising: at least one processor and at least one non-transitory computer readable medium (e.g., memory) storing computer executable instructions that, when executed by the at least one processor, cause the computer system to perform a method as described herein and in the following examples. In another embodiment, the present disclosure includes a non-transitory computer-readable medium storing computer-executable instructions that, when executed by at least one processor, perform a method as described herein and in the following examples.

In one embodiment, the present disclosure includes a method of data recovery comprising: retrieving data from a backup data storage medium; storing the data in a buffer; retrieving data pages of the data from the buffer; performing a plurality of processing functions on the data pages to produce processed data pages; storing the processed data pages in a main memory of a database system, the database writing the processed data pages to a persistent memory of the database system; and adjusting a throughput of the plurality of processing functions based on an available capacity of the main memory.

In one embodiment, the processing functions operate in parallel and a number of processing functions operating in parallel is reduced when the available capacity of the main memory decreases below a threshold.

In one embodiment, the method further comprising, for each data page: allocating a memory page in the main memory of the database system to store each data page; copying each data page to the memory page allocated in main memory; and performing, by one of the processing functions, a checksum operation.

In one embodiment, the plurality of processing functions has a corresponding plurality of queues to receive tasks to process particular data pages, wherein the plurality of processing functions receives one or more tasks from the plurality of queues, and wherein a number of processing functions is increased or decreased based on a number of tasks in the queues.

In one embodiment, adjusting the throughput of the plurality of processing functions based on the available capacity of the main memory is prioritized over increasing or decreasing the number of processing functions based on the number of tasks in the queues.

In one embodiment, when the number of tasks in the queues is above a threshold, increasing the number of processing functions.

In one embodiment, when the number of tasks in the queues is below a threshold, reducing a number of processing functions.

In one embodiment, the method further comprising counting a number of empty queues, wherein when the number of empty queues is below a first threshold, then a number of processing functions is increased, and wherein when the number of empty queues is above a second threshold, then the number of processing functions is reduced.

In one embodiment, the plurality of processing functions is a plurality of jobs operating on a plurality of threads.

In one embodiment, the plurality of processing functions process the data pages from main memory and send the processed data pages in a queue before writing the processed data pages to persistent memory.

In one embodiment, the database writing the processed data pages to the persistent memory of the database system further comprises encrypting the processed data pages.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method of data recovery for a database system, the method comprising:

retrieving data from a backup data storage medium, wherein the data was previously backed up to the backup data storage medium from the database system;

storing the data in a buffer;

retrieving data pages of the data from the buffer into a main memory of the database system;

performing, in parallel, a plurality of checksum validation jobs on the data pages in the main memory to produce processed data pages;

storing the processed data pages in the main memory and subsequently writing the processed data pages from the main memory to a persistent memory of the database system, thereby restoring the data to the database system; and adjusting a number of the plurality of checksum validation jobs being performed in parallel based on an available capacity of the main memory so that the available capacity of the main memory is kept between first and second thresholds during the data recovery, wherein adjusting the number of the plurality of checksum validation jobs based on the available capacity of the main memory is prioritized over adjusting the number of the plurality of checksum validation jobs based on a number of tasks in one or more queues.

2. The method of claim 1, further comprising, for each data page:

allocating a memory page in the main memory of the database system to store each data page;

copying each data page to the memory page allocated in main memory; and performing, by one of the plurality of checksum validation jobs, a checksum validation operation on the data page.

3. The method of claim 1, wherein the plurality of checksum validation jobs has a corresponding plurality of queues to receive tasks to process particular data pages, wherein the plurality of checksum validation jobs receives one or more tasks from the plurality of queues, and wherein the adjusting of the number of the plurality of checksum validation jobs is further based on a number of tasks in the plurality of queues.

4. The method of claim 3, wherein when the number of tasks in the plurality of queues is above a threshold, the number of the plurality of checksum validation jobs is increased.

5. The method of claim 3, wherein when the number of tasks in the plurality of queues is below a threshold, the number of the plurality of checksum validation jobs is reduced.

6. The method of claim 3, further comprising counting a number of empty queues, wherein when the number of empty queues is below a first threshold, then the number of the plurality of checksum validation jobs is increased, and wherein when the number of empty queues is above a second threshold, then the number of the plurality of checksum validation jobs is reduced.

7. The method of claim 1, wherein the plurality of checksum validation jobs operate on a plurality of threads.

8. The method of claim 1, wherein the plurality of checksum validation jobs process the data pages from the main memory and send the processed data pages in a queue before writing the processed data pages to the persistent memory.

9. The method of claim 1, wherein the processed data pages are written to the persistent memory in encrypted form.

10. A computer system comprising:

at least one processor;

at least one non-transitory computer readable medium storing computer executable instructions that, when executed by the at least one processor, cause the computer system to perform a method of data recovery for a database system comprising:

retrieving data from a backup data storage medium, wherein the data was previously backed up to the backup data storage medium from the database system;

storing the data in a buffer;

retrieving data pages of the data from the buffer into a main memory of the database system;

performing, in parallel, a plurality of checksum validation jobs on the data pages in the main memory to produce processed data pages;

storing the processed data pages in the main memory and subsequently writing the processed data pages to a persistent memory of the database system, thereby restoring the data to the database system; and adjusting a number of the plurality of checksum validation jobs being performed in parallel based on an available capacity of the main memory so that the available capacity of the main memory is kept between first and second thresholds during the data recovery, wherein adjusting the number of the plurality of checksum validation jobs based on the available capacity of the main memory is prioritized over adjusting the number of the plurality of checksum validation jobs based on a number of tasks in one or more queues.

11. The computer system of claim 10, further comprising, for each data page:

allocating a memory page in the main memory of the database system to store each data page;

copying each data page to the memory page allocated in main memory; and performing, by one of the plurality of checksum validation jobs, a checksum validation operation on the data page.

12. The computer system of claim 10, wherein the plurality of checksum validation jobs has a corresponding plurality of queues to receive tasks to process particular data pages, wherein the plurality of checksum validation jobs receives one or more tasks from the plurality of queues, and wherein the adjusting of the number of the plurality of checksum validation jobs is further based on a number of tasks in the plurality of queues.

13. The computer system of claim 12, wherein when the number of tasks in the plurality of queues is above a threshold, the number of the plurality of checksum validation jobs is increased.

14. The computer system of claim 12, wherein when the number of tasks in the plurality of queues is below a threshold, the number of the plurality of checksum validation jobs is reduced.

15. The computer system of claim 12, further comprising counting a number of empty queues, wherein when the number of empty queues is below a first threshold, then the number of the plurality of checksum validation jobs is increased, and wherein when the number of empty queues is above a second threshold, then the number of the plurality of checksum validation jobs is reduced.

16. A non-transitory computer-readable medium storing computer-executable instructions that, when executed by at least one processor, perform a method of data recovery for a database system, the method comprising:

retrieving data from a backup data storage medium, wherein the data was previously backed up to the backup data storage medium from the database system;

storing the data in a buffer;

retrieving data pages of the data from the buffer into a main memory of the database system;

performing, in parallel, a plurality of checksum validation jobs on the data pages in the main memory to produce processed data pages; and storing the processed data pages in the main memory and subsequently writing the processed data pages from the main memory to a persistent memory of the database system, thereby restoring the data to the database system; and adjusting a number of the plurality of checksum validation jobs being performed in parallel based on an available capacity of the main memory so that the available capacity of the main memory is kept between first and second thresholds during the data recovery, wherein adjusting the number of the plurality of checksum validation jobs based on the available capacity of the main memory is prioritized over adjusting the number of the plurality of checksum validation jobs based on a number of tasks in one or more queues.

17. The non-transitory computer-readable medium of claim 16, wherein the plurality of checksum validation jobs has a corresponding plurality of queues to receive tasks to process particular data pages, wherein the plurality of checksum validation jobs receives one or more tasks from the plurality of queues, and wherein the adjusting of the number of the plurality of checksum validation jobs is further based on a number of tasks in the plurality of queues.

18. The non-transitory computer-readable medium of claim 16, wherein the adjusting comprises increasing the number of the plurality of checksum validation jobs being performed in parallel on the data pages in the main memory when the available capacity of the main memory exceeds the first threshold, and wherein the adjusting comprises reducing the number of the plurality of checksum validation jobs being performed in parallel on the data pages in the main memory when the available capacity of the main memory falls below the second threshold.

19. The method of claim 1, wherein the adjusting comprises increasing the number of the plurality of checksum validation jobs being performed in parallel on the data pages in the main memory when the available capacity of the main memory exceeds the first threshold, and wherein the adjusting comprises reducing the number of the plurality of checksum validation jobs being performed in parallel on the data pages in the main memory when the available capacity of the main memory falls below the second threshold.

20. The computer system of claim 10, wherein the adjusting comprises increasing the number of the plurality of checksum validation jobs being performed in parallel on the data pages in the main memory when the available capacity of the main memory exceeds the first threshold, and wherein the adjusting comprises reducing the number of the plurality of checksum validation jobs being performed in parallel on the data pages in the main memory when the available capacity of the main memory falls below the second threshold.

* * * * *